United States Patent
Brown

(10) Patent No.: US 9,701,255 B2
(45) Date of Patent: Jul. 11, 2017

(54) COMBINATION BIKE RACK AND STEP ASSEMBLY FOR A VEHICLE

(71) Applicant: Kent L. Brown, Des Moines, IA (US)

(72) Inventor: Kent L. Brown, Des Moines, IA (US)

(*) Notice: Subject to any disclaimer, the term of this patent is extended or adjusted under 35 U.S.C. 154(b) by 161 days.

(21) Appl. No.: 14/040,139

(22) Filed: Sep. 27, 2013

(65) Prior Publication Data

US 2014/0091122 A1 Apr. 3, 2014

Related U.S. Application Data

(60) Provisional application No. 61/706,894, filed on Sep. 28, 2012.

(51) Int. Cl.
*B60R 9/06* (2006.01)
*B60R 9/00* (2006.01)
*B60R 3/00* (2006.01)
*B60R 9/10* (2006.01)

(52) U.S. Cl.
CPC .............. *B60R 9/00* (2013.01); *B60R 3/007* (2013.01); *B60R 9/06* (2013.01); *B60R 9/10* (2013.01)

(58) Field of Classification Search
CPC .. B60R 9/00; B60R 3/007; B60R 3/02; B60R 9/10; B60R 9/06
USPC ........................................ 224/519, 521, 921
See application file for complete search history.

(56) References Cited

U.S. PATENT DOCUMENTS

| | | | | |
|---|---|---|---|---|
| 5,056,699 A | * | 10/1991 | Newbold | B60R 9/06 224/314 |
| 5,083,324 A | * | 1/1992 | Strong | A47K 11/04 182/187 |
| 5,232,133 A | * | 8/1993 | Speer | 224/485 |
| 5,775,560 A | * | 7/1998 | Zahn et al. | 224/524 |
| 6,023,792 A | * | 2/2000 | Croucher | A47K 11/02 4/458 |
| 7,114,736 B2 | * | 10/2006 | Stodola et al. | 280/164.1 |
| 7,165,704 B2 | * | 1/2007 | Lo | B60R 9/06 224/499 |
| 7,419,076 B1 | * | 9/2008 | Grothues | 224/519 |
| 7,819,128 B2 | * | 10/2010 | Clark et al. | 135/88.08 |
| 8,123,190 B2 | * | 2/2012 | Kost | 248/514 |
| 8,485,207 B1 | * | 7/2013 | Boyington | 135/88.08 |
| 8,833,518 B2 | * | 9/2014 | Holcombe | A01M 31/02 16/348 |
| 2005/0241546 A1 | * | 11/2005 | Royse | B60R 9/06 108/44 |
| 2006/0053667 A1 | * | 3/2006 | Andersen | G09F 21/04 40/591 |
| 2007/0215565 A1 | * | 9/2007 | Huang | B60R 9/10 211/17 |
| 2008/0006184 A1 | * | 1/2008 | Simon | B60R 9/06 108/44 |
| 2009/0302078 A1 | * | 12/2009 | Wang | B60R 9/06 224/502 |

* cited by examiner

*Primary Examiner* — Adam Waggenspack
(74) *Attorney, Agent, or Firm* — Zarley Law Firm, P.L.C.

(57) ABSTRACT

An assembly for mounting to a vehicle having a mounting member connected to a receiver of a vehicle. A frame member is pivotally connected to the mounting member and legs are pivotally mounted to the frame member.

9 Claims, 5 Drawing Sheets

COMBINATION BIKE RACK AND STEP ASSEMBLY FOR A VEHICLE

BACKGROUND OF THE INVENTION

The invention is directed to a multi-purpose accessory for a vehicle and more particularly a combination bike rack and step assembly.

Devices for attachment to a vehicle have a number of uses and are well known in the art. For example, known are bike rack assemblies that fit within and are attached to the receiver of a vehicle. Likewise, particularly for use with pick-up trucks, a step or stairs fit within and are connected to the receiver of a vehicle. Some of these attachments have multi-purposes. Multi-purpose attachments typically have many parts, are complex to assemble, and difficult to operate.

Thus, there is a need in the art for a vehicle attachment that can be used for multiple purposes, that has few parts, and is easy to assemble and operate.

An objective of the present invention is to provide a vehicle mount cable of use as steps or a bike rack.

Another objective of the present invention is to provide a multi-purpose vehicle mount that is inexpensive and easy to mount.

These and other objectives will be apparent to one of ordinary skill in the art based upon the following written description, drawings, and claims

SUMMARY OF THE INVENTION

An assembly for mounting to a vehicle having a mounting member connected to a receiver of a vehicle. A frame member is pivotally connected to the mounting member and legs are pivotally mounted to the frame member.

DETAILED DESCRIPTION OF THE PREFERRED EMBODIMENTS

Figure 1:
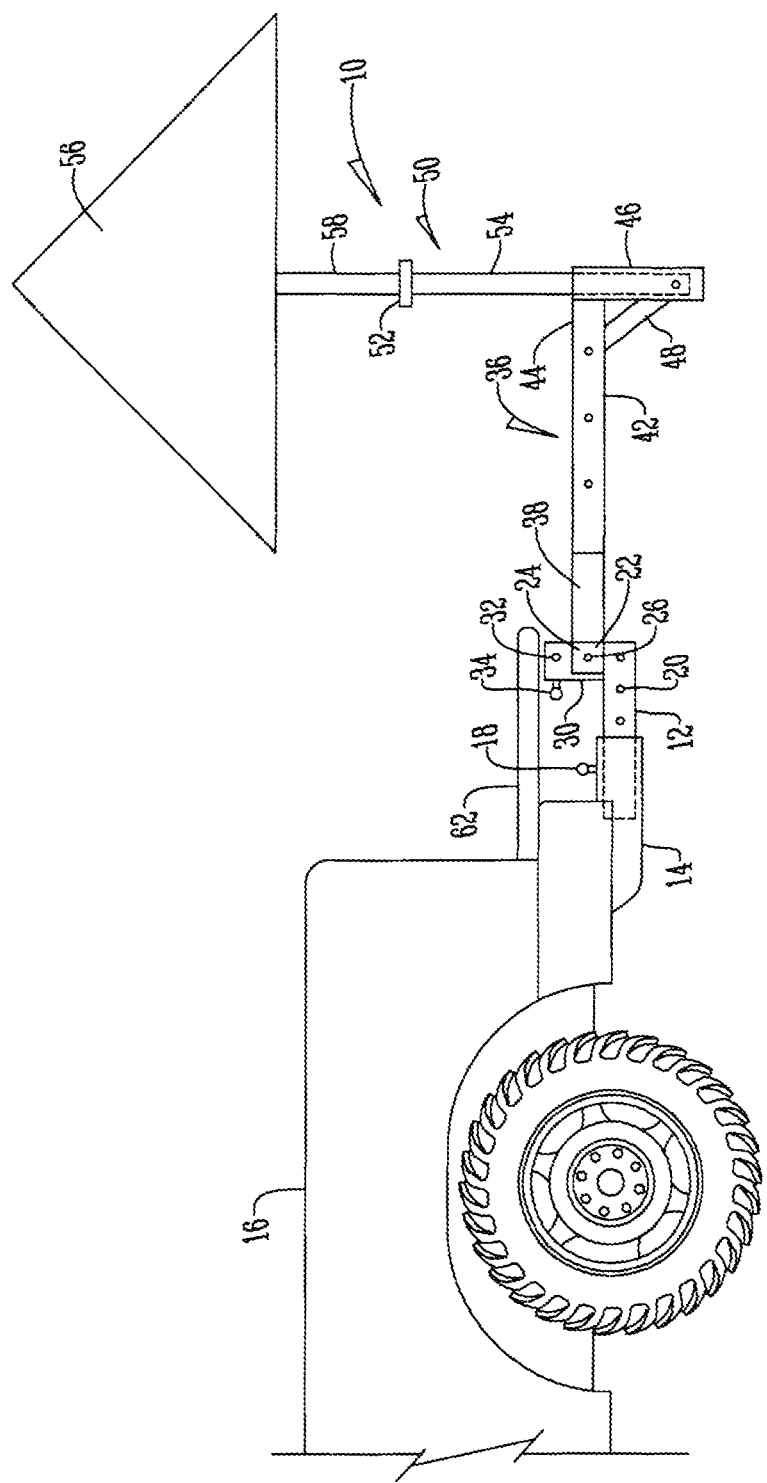
FIG. 1 is a side view of a mounting assembly for a vehicle.
Figure 2:
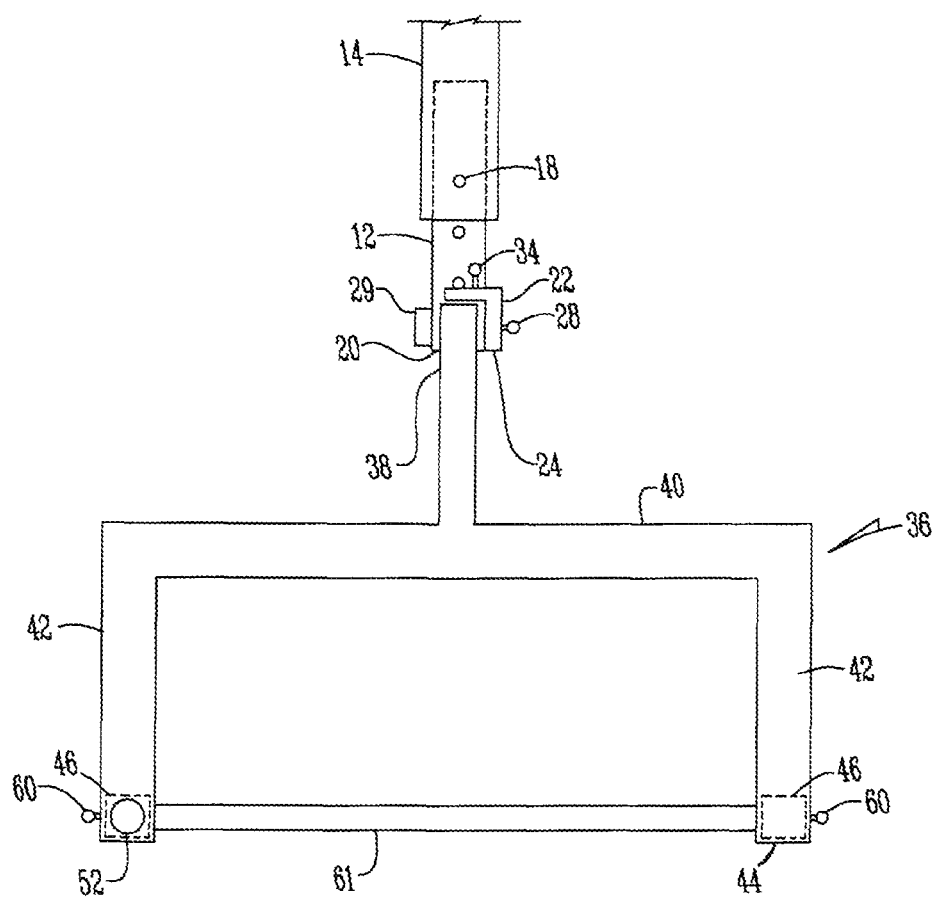
FIG. 2 is a top plan view of a mounting assembly for a vehicle.
Figure 3:
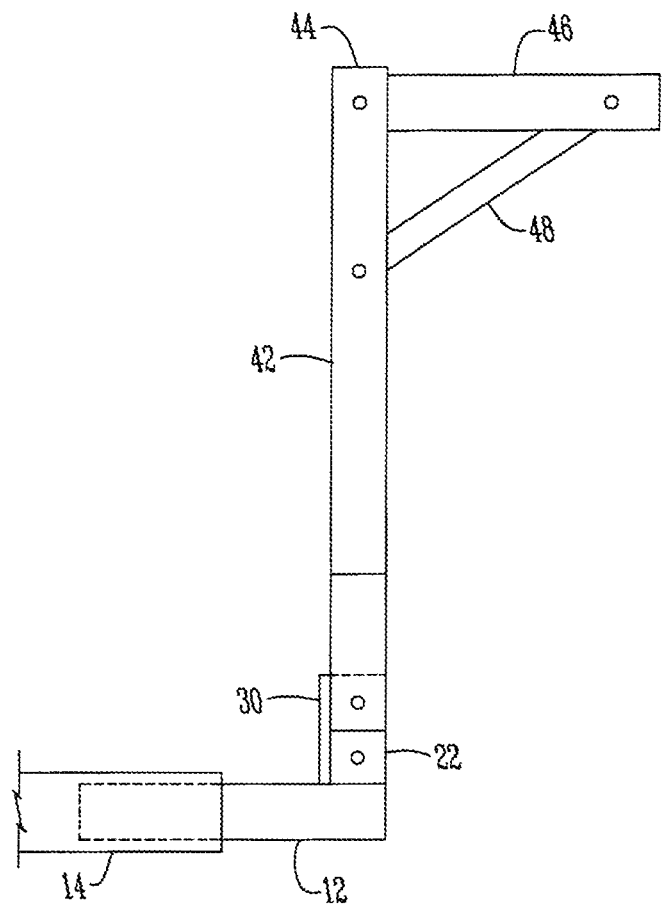
FIG. 3 is a side view of a mounting assembly for a vehicle.
Figure 4:
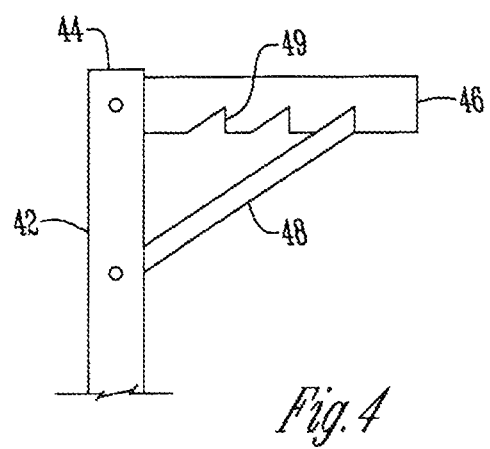
FIG. 4 is a partial side view of a mounting assembly for a vehicle.
Figure 5:
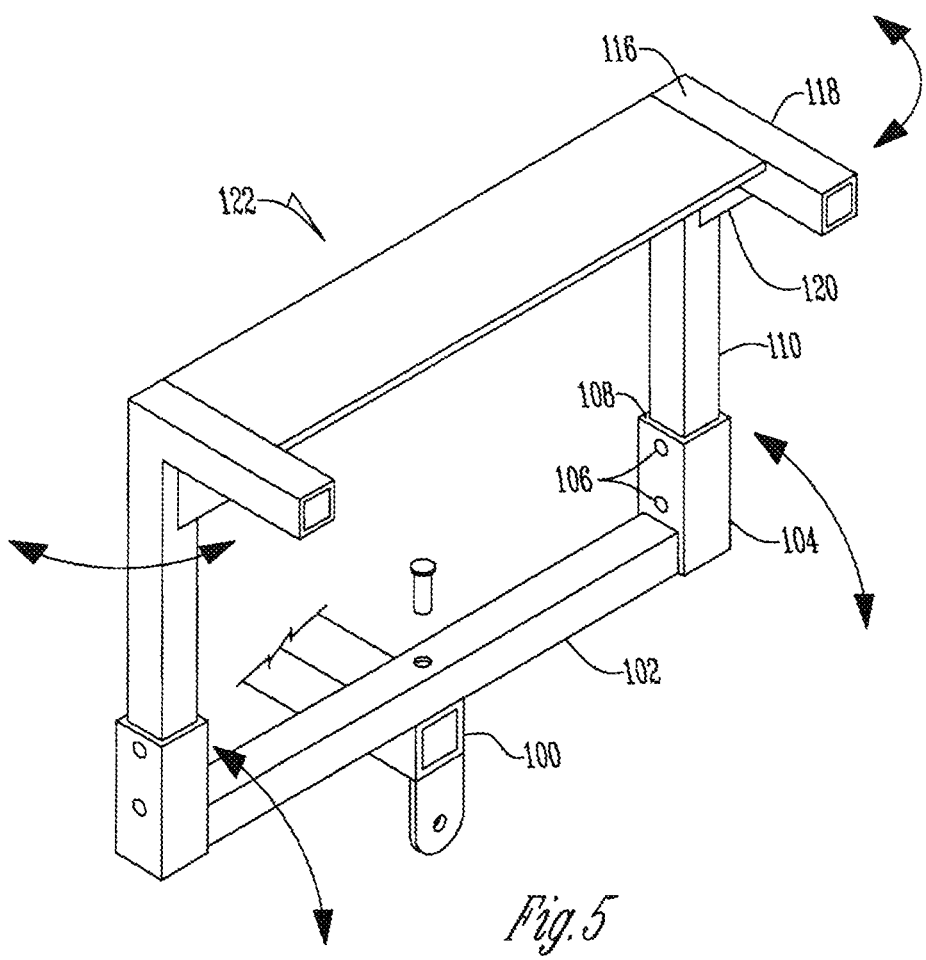
FIG. 5 is a perspective view of a mounting assembly for a vehicle.
Figure 6:
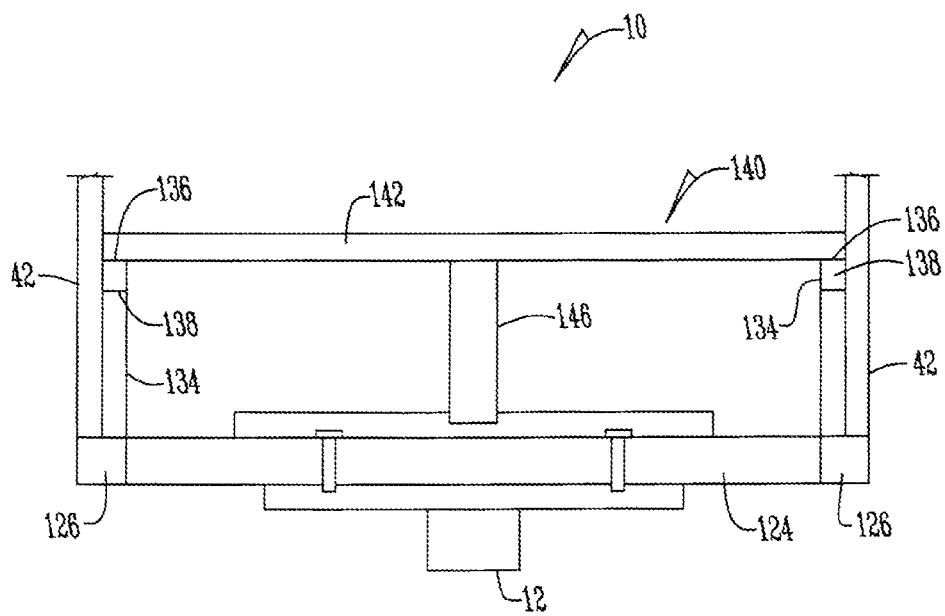
FIG. 6 is a top plan view of a mounting assembly for a vehicle.
Figure 7:
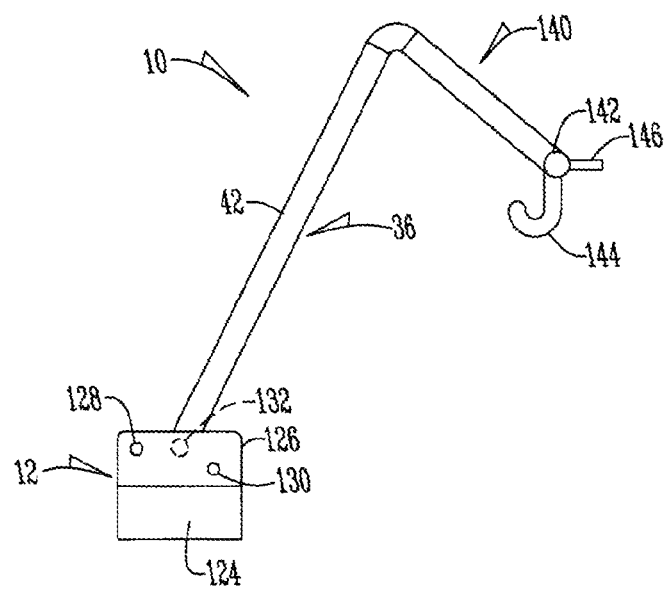
FIG. 7 is a side view of a mounting assembly for a vehicle.

Referring to the Figures, the combination step and bike rack assembly 10 includes a mounting member 12 that fits within the receiver 14 of a vehicle 16 such as a pick-up truck or the like. The mounting member 12 has a plurality of openings that align with openings in the receiver 14 such that a locking pin or clevis pin 18 extends through the openings to connect the mounting member 12 to the receiver 14.

On the outer end 20 of the mounting member 12 is a bracket 22 having a pair of upwardly extending flanges 24. Each flange 24 has an opening 26 that receives a pivot pin 28. Also extending upwardly from the mounting member 12 is a locking member 30. The locking member 30 has an opening 32 that receives a locking or clevis pin 34. Preferably, the mounting member 12 extends outwardly approximately five inches from the receiver.

Pivotally mounted to the bracket 22 of the mounting member 12 by pin 28 is a frame member 36 that preferably has a connecting section 38, a cross section 40 and two support sections 42 that extend outwardly from the ends of the cross section 40 to generally form a C-shaped frame. The connecting section 38 has an opening 43 that aligns with opening 32 of locking member 30 to receive pin 34 when the frame member 36 is in an upright or transport position.

The combined length of the connecting section 38 and support sections 42 preferably is approximately 19 inches. The width between the support sections 42 preferably is at least 14 inches so as not to obstruct the license plate of the vehicle 16.

Pivotally attached to the outer end 44 of each support section 42 is a hollow leg 46. Alternatively, the legs 46 are welded in a fixed position. Preferably the legs 46 are approximately 18 inches in length. Angularly extending between the support sections 42 and the legs 46 and selectively and pivotally connected to each are a pair of braces 48. The braces 48 assist in locking the legs 46 in an extended position and also provide support. In an alternative embodiment the legs 46 have a plurality of notches 49 that selectively receive an end of a brace 48.

Disposed within at least one leg 46 is a handle 50 having a gripping portion 52 and a telescopic shaft 54. Alternatively, an umbrella 56 having a telescopic shaft 58 can be placed in one or more hollow legs 46.

Extending between legs 46, preferably below support sections 42 and braces 48 is a step 61.

In operation, the assembly 10 is connected to the vehicle 16 by inserting the mounting member 12 into receiver 14 and inserting pin 18 through openings to connect the mounting member 12 to the receiver 14. To transport, frame member 36 is raised to an upright position until stopped by locking member 30. Once in a raised position, pin 34 is inserted through opening 32 and 44 to lock the frame member 36 in an upright position.

The legs 46 can be released to lie in the same plane as support sections 42 or can be locked in position using a clevis or locking pin 60 and/or use of the braces 48. When in an extended or locked position, the assembly 10 may be used to haul items such as bicycles that are secured to the assembly.

To use as a step, the frame member 36 is released from the locking member 30 and lowered to an extended or lowered position wherein they angle perpendicularly to the ground from frame member 36. Likewise, the legs 46 are locked in an extended and locked in position either using pin 60, braces 48, or both. Once locked, the handle 50 is raised from leg 46 and locked in position preferably using detents and openings and the umbrella 56 is extended and placed in the outer leg 46. Then, the tailgate is lowered and an individual climbs into the bed of the vehicle by first stepping on step 59 and then the tailgate 62 of the vehicle.

In addition to the above, in an alternative arrangement, a mounting member 100 that fits within the receiver 14 of a vehicle 16 such as a pick-up truck or the like. Connected to the mounting member 100 is cross-member 102. Cross-member 102 is removeably and replaceably connected to mounting member 100 by way of a through-hole and locking pin arrangement 103, or any other joint, so as to allow cross-member 102 to be mounted to mounting member 100 at various angular positions, such as parallel or perpendicular, which is similar to the arrangement described above with respect to bracket 22, flanges 24, pivot pin 28, locking member 30, etc.

Preferably cross-member 102 extends perpendicular to mounting member 100, parallel to the ground and parallel to the rear of vehicle 16. Preferably cross-member 102 is a square or round tube, alternatively any structurally ridged member can be used such as an I-beam, angle iron, or the like. Connected to cross-member 102 At each outward end of cross-member 102 is a socket 104 having a plurality of holes 106 therein. Preferably socket 104 extends perpendicularly upward from and is made of the same material as cross-member 102 with open upward ends 108.

Removeably and replaceably positioned within open upward ends 108 are support sections 110. Preferably support sections 110 are made of the same or similarly shaped material as cross member 102 and sockets 104, only slightly smaller or larger so as to facilitate the mating reception of the support sections over or within sockets 104 in a male/female relationship. Support sections 110 have a plurality of holes 112 which when in position in or over socket 104 align with holes 106 in socket 104 such that a locking pin 114 can be passed there through thereby locking the support section 110 and socket 104 together.

Pivotally attached to the outer end 116 of each support section 110 is a hollow leg 118. Alternatively, the legs 118 are welded in a fixed position. Preferably the legs 118 are approximately 18 inches in length. Angularly extending between the support sections 110 and the legs 118 and selectively and pivotally connected to each are a pair of braces 120. The braces 120 assist in locking the legs 118 in an extended position and also provide support. In an alternative embodiment the legs 118 have a plurality of notches as is described above that selectively receive an end of a brace 120.

Leg 118 preferably extends perpendicular to the length of support section 110 in an L-shaped fashion. Due to the use of socket 104 support section 110 is postitionable such that legs 118 extend outwardly parallel to the length of mounting member 100 or alternatively, legs 11 extend outwardly perpendicular to the length of mounting member 100.

Connected to and extending across support sections 110 is step 122. Step 122 is preferably connected to support sections by way of a joint, such as a through hole and pin arrangement or the like described herein, which allows for the rotation of legs 118 from a perpendicular to parallel arrangement. Preferably step 122 is connected to support sections 110 at or near outer end 116.

In yet another embodiment, the mounting member 12 has a cross-section 124 having bracket members 126 at each end. The bracket members 126 have a pair of openings 128 and 130 that selectively receive a compressible locking pin 132. The compressible locking pin extends outwardly from the support sections 42 of the frame member 36. The frame member 36 is hingedly connected to the mounting member 12.

Attached to the inside of support sections 42 are brackets 134. The brackets 134 each have a slot 136 with a rod 138 disposed within the bracket 134 and aligned with the slot 136.

A leg section 140 is hingedly attached to the end of the support sections 42. The leg section 140 has a rotatable rod 142 with a pair of hooks 144 that are received within slots 136 and engage rod 138 to releasably secure the leg section 140 to brackets 134. A latch 146 is attached to rod 142.

To lower the assembly 10, first, rod 142 is rotated such that hooks 144 release from rods 138 allowing the leg section 140 to extend outwardly from frame member 36. Then, locking pin 132 is compressed releasing the frame member 36 so that it may be lowered from a vertical to horizontal position.

Thus, disclosed is a multi-purpose vehicle assembly that, at the very least, meets all the stated objectives.

What is claimed:

1. An assembly for mounting to a vehicle, comprising:
a mounting member having a bracket at one end;
a frame member having a section which crosses and a pair of support sections extending outwardly from the section which crosses wherein the frame member is pivotally connected to the bracket, wherein when in a raised position the frame member extends upwardly in relation to the ground and when in a lowered position the frame member extends in substantially parallel alignment with the ground;
a pair of legs connected to an end of each support section, wherein when the frame member is in the lowered position and the pair of legs are in a first locked position, the pair of legs extend in the same direction as the pair of support sections, and when the pair of legs are in a second locked position, the pair of legs extend below the plane of the support section and engage the ground;
a step extending between the pair of legs; and
wherein the frame and the pair of legs are configured to receive at least one bicycle.

2. The assembly of claim 1 wherein the step is positioned below the support section.

3. An assembly for mounting to a vehicle, comprising:
a mounting member having a bracket at one end;
a frame member having a section which crosses and a pair of support sections extending outwardly from the section which crosses wherein the frame member is pivotally connected to the bracket, wherein when in a raised position the frame member extends upwardly in relation to the ground and when in a lowered position the frame member extends in substantially parallel alignment with the ground;
a pair of legs pivotally connected to outer ends of the pair of support sections, wherein when the frame member is in the lowered position and the pair of legs is in a first locked position, the pair of legs extend in the same direction and in the same plane as the pair of support sections, and when the pair of legs are in a second locked position, the pair of legs extend substantially perpendicular to and engage the ground;
a step that extends between the pair of legs; and
wherein the frame member and pair of legs are configured to receive and secure at least one bicycle.

4. The assembly of claim 3 wherein the legs are hollow.

5. The assembly of claim 4 wherein a handle is received within one of the pair of legs.

6. The assembly of claim 5 wherein an umbrella is received within one of the pair of legs.

7. The assembly of claim 3 wherein the bracket is L-shaped.

8. The assembly of claim 3 wherein a pin secures the pair of legs in the first locked position and the second locked position.

9. The assembly of claim 3 wherein a pair of braces secure the pair of legs in the first locked position and the second locked position.

* * * * *